(12) United States Patent
Brown

(10) Patent No.: US 6,437,529 B1
(45) Date of Patent: *Aug. 20, 2002

(54) MULTI-STATOR MOTOR WITH INDEPENDENT STATOR CIRCUITS

(75) Inventor: Fred A. Brown, Coronado, CA (US)

(73) Assignee: Comair Rotron, Inc., San Ysidro, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,242

(22) Filed: May 4, 1998

(51) Int. Cl.$^7$ ................................................ H02K 13/00

(52) U.S. Cl. ..................... 318/439; 318/254; 318/138; 318/494; 318/495; 318/496; 318/564

(58) Field of Search ................................. 318/254, 439, 318/138, 494–496, 564; 310/268, 112, 136, 140–142, 254–258

(56) References Cited

U.S. PATENT DOCUMENTS

| | | | |
|---|---|---|---|
| 1,850,598 A | 3/1932 | Mills et al. | |
| 2,112,852 A | 4/1938 | Lindell | |
| 2,824,272 A | 2/1958 | Delaporte | |
| 2,830,246 A | 4/1958 | Thomas | |
| 3,373,291 A | 3/1968 | Lytle et al. | |
| 3,454,857 A | * 7/1969 | Farrand et al. | 318/166 |
| 3,462,667 A | 8/1969 | Jackson | 318/138 |
| 3,497,730 A | 2/1970 | Doolittle | 310/13 |
| 3,806,744 A | 4/1974 | Abraham et al. | 310/49 |
| 3,809,990 A | 5/1974 | Kuo et al. | 318/696 |
| 3,921,017 A | 11/1975 | Hallerbäck | 310/216 |
| 3,950,684 A | * 4/1976 | Randall | 318/564 |
| 4,074,160 A | * 2/1978 | Broadway | 310/184 |
| 4,162,438 A | * 7/1979 | Osder | 318/564 |
| 4,206,374 A | 6/1980 | Goddijn | 310/49 R |
| 4,211,963 A | 7/1980 | Müller | 318/234 |
| 4,327,299 A | 4/1982 | Goddijn | 310/49 R |
| 4,355,249 A | 10/1982 | Kenwell | 310/49 R |
| 4,434,389 A | * 2/1984 | Langley et al. | 318/254 |
| 4,494,028 A | 1/1985 | Brown | 310/156 |
| 4,535,263 A | 8/1985 | Avery | 310/112 |
| 4,550,267 A | * 10/1985 | Vaidya | 310/184 |
| 4,626,752 A | 12/1986 | Fujisaki et al. | 318/254 |
| 4,631,456 A | 12/1986 | Drescher et al. | 318/140 |
| 4,779,069 A | 10/1988 | Brown | 335/284 |
| 4,785,213 A | 11/1988 | Satake | 310/116 |
| 4,794,292 A | 12/1988 | Torisawa | 310/257 |
| 4,920,293 A | 4/1990 | Kanda | 310/116 |

(List continued on next page.)

FOREIGN PATENT DOCUMENTS

| | | |
|---|---|---|
| EP | 0 216 998 A1 | 6/1986 |
| EP | 0 497 317 A1 | 1/1991 |
| WO | WO 94/14226 | 6/1994 |

OTHER PUBLICATIONS

Richard C. Dorf (Editor–in–Chief), The Electrical Engineering Handbook 2nd Edition 1997, CRC Press/IEEE Press, p. 1470.*

Primary Examiner—Robert E. Nappi
Assistant Examiner—Tyrone Smith
(74) Attorney, Agent, or Firm—Bromberg & Sunstein LLP

(57) ABSTRACT

First and second stator circuitry for respective use with first and second stators in a multi-stator motor are configured so that the first stator circuitry is substantially unaffected by a failure of the second stator circuitry to energize a second winding in the second stator. To that end, the motor includes a rotor that rotates through a plurality of rotational positions, the first stator having the first stator circuitry and a first winding, and the second stator having the second stator circuitry and a second winding. The first stator circuitry energizes the first winding in response to the rotational position of the rotor. In a similar manner, the second stator circuitry energizes the second winding in response to the rotational position of the rotor.

24 Claims, 3 Drawing Sheets

U.S. PATENT DOCUMENTS

| | | | | |
|---|---|---|---|---|
| 4,945,296 A | | 7/1990 | Satake | 318/538 |
| 4,988,907 A | * | 1/1991 | Irwin | 310/181 |
| 5,117,141 A | * | 5/1992 | Hawsey et al. | 310/114 |
| 5,126,606 A | | 6/1992 | Hofmann | 310/49 R |
| 5,164,623 A | | 11/1992 | Shkondin | 310/67 R |
| 5,177,388 A | | 1/1993 | Hotta et al. | 310/114 |
| 5,183,387 A | | 2/1993 | Huggett et al. | 416/147 |
| 5,194,773 A | | 3/1993 | Clarke | 310/112 |
| 5,200,659 A | | 4/1993 | Clarke | 310/112 |
| 5,216,339 A | | 6/1993 | Skybyk | 318/254 |
| 5,218,251 A | | 6/1993 | Allwine, Jr. | 310/49 R |
| 5,258,697 A | | 11/1993 | Ford et al. | 318/498 |
| 5,272,401 A | | 12/1993 | Lin | 310/49 R |
| 5,274,291 A | | 12/1993 | Clarke | 310/112 |
| 5,281,879 A | | 1/1994 | Satake et al. | 310/114 |
| 5,440,185 A | | 8/1995 | Allwine, Jr. | 310/156 |
| 5,481,147 A | | 1/1996 | Kaplan et al. | 310/154 |
| 5,485,046 A | | 1/1996 | Kaplan et al. | 310/166 |
| 5,517,102 A | * | 5/1996 | Jensen | 318/701 |
| 5,652,493 A | | 7/1997 | Hendershot, Jr. | 318/701 |
| 5,670,837 A | | 9/1997 | Boutaghou et al. | 310/184 |
| 5,677,580 A | | 10/1997 | Huang | 310/44 |
| 5,834,866 A | * | 11/1998 | Fujitani et al. | 310/49 |
| 5,894,183 A | * | 4/1999 | Borchert | 310/261 |
| 5,945,766 A | * | 8/1999 | Kim et al. | 310/268 |

* cited by examiner

MULTI-STATOR MOTOR WITH INDEPENDENT STATOR CIRCUITS

FIELD OF THE INVENTION

The invention generally relates to electric motors and, more particularly, the invention relates to electric motors with multiple stators.

BACKGROUND OF THE INVENTION

Rotational torque in an electric motor typically is improved when multiple stators are utilized to rotate a common rotor. Such motors generally are referred to as "multi-stator" motors. Each stator in a multi-stator motor typically includes poles and windings that are selectively energized by shared energizing circuitry. Energizing circuitry typically includes magnetic sensors (e.g., Hall effect sensors) to detect the rotational position of the rotor, switching circuitry to alternatively energize the windings and poles of selected stators, voltage regulation circuitry for regulating input voltage, and current limiting circuitry (e.g., a fuse) for limiting input current into the motor.

Problems arise, however, when the energizing circuitry malfunctions. For example, the voltage regulation circuitry may malfunction, consequently not providing enough energizing voltage to the windings. Accordingly, the motor undesirably may not operate since the windings cannot be energized. Other similar energizing circuitry malfunctions also can cause the motor to stop functioning. It therefore would be desirable to have energizing circuitry on an electric motor that enables the motor to continue operating even if such circuitry does malfunction.

SUMMARY OF THE INVENTION

In accordance with one aspect of the invention, first and second stator circuitry for respective use with first and second stators in a multi-stator motor are configured so that, when operating, the first stator circuitry will continue to energize a first winding in the first stator even when the second stator circuitry fails to energize a second winding in the second stator. To that end, the motor includes a rotor that rotates through a plurality of rotational positions, the first stator having the first stator circuitry and the first winding, and the second stator having the second stator circuitry and the second winding. The first stator circuitry energizes the first winding in response to the rotational position of the rotor. In a similar manner, the second stator circuitry energizes the second winding in response to the rotational position of the rotor.

In other embodiments of the invention, the operation of the second stator circuitry is substantially unaffected by a failure of the first stator circuitry to energize the first winding. The first stator circuitry may include means for receiving power from a first power source, while the second stator circuitry may include means for receiving power from a second power source. Failure of one power source therefore does not affect the performance of the stator utilizing the other power source.

In yet other aspects of the invention, the first stator circuitry includes a first voltage regulator for regulating input voltage into the first stator circuitry, and a first current limiter for limiting input current into the first stator circuitry. In a similar manner, the second stator may include a second voltage regulator for regulating input voltage into the second stator circuitry, and a second current limiter for limiting input current into the second stator circuitry. In preferred embodiments, the first stator and the second stator are substantially concentric. In other embodiments, the first stator is angularly offset from the second stator. The first stator also may include a first pole that contacts the second winding, thus reducing the profile of the motor. In yet other embodiments, the rotor may include an impeller.

In another aspect of the invention, the first stator circuitry is substantially independently operable from the second stator circuitry. Specifically, the first stator circuitry may be considered to be electrically independent from the second stator circuitry.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
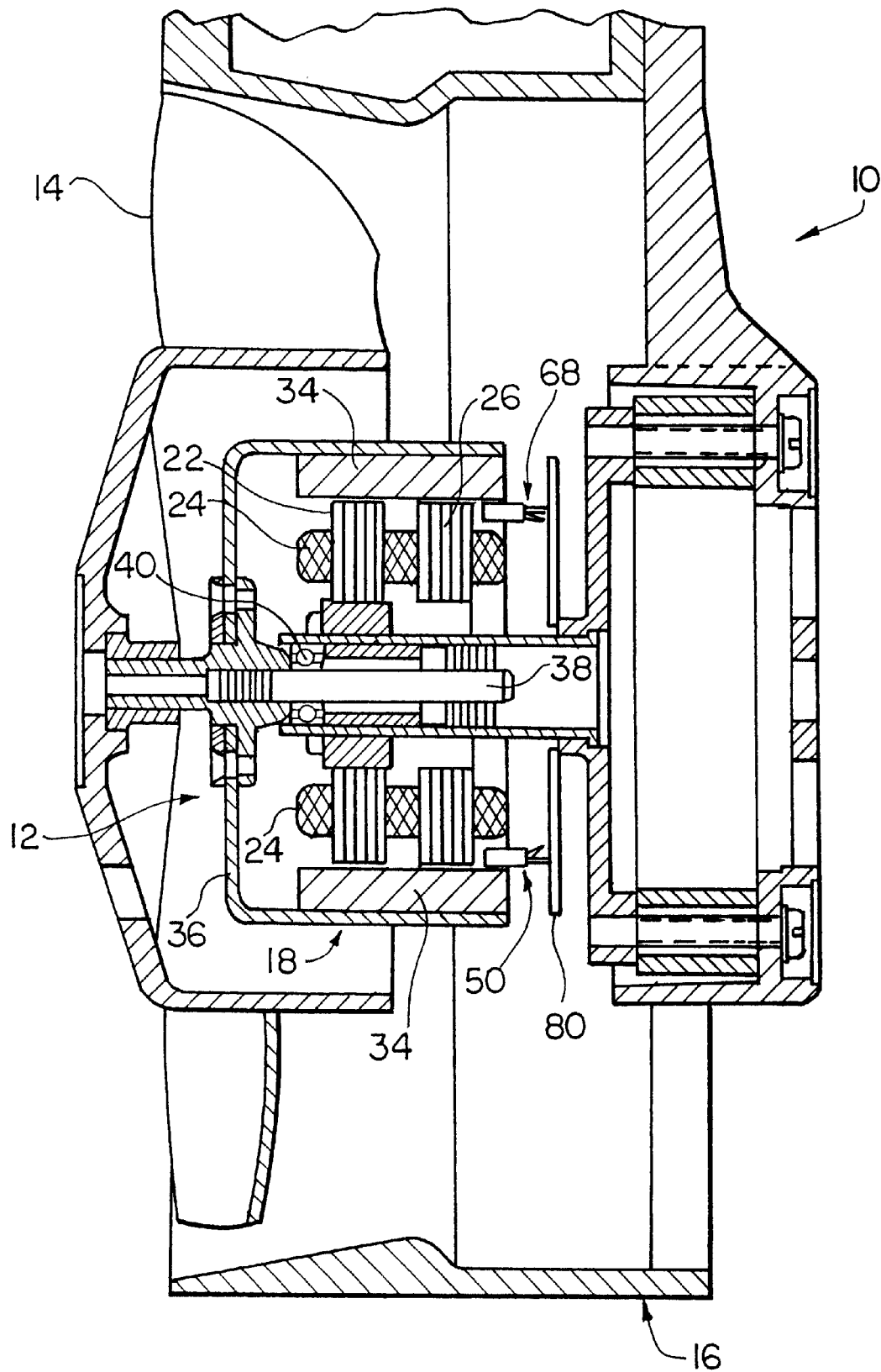
FIG. 1 schematically shows a cross-sectional view of a fan having a multi-stator electric motor configured in accordance with preferred embodiments of the invention.

FIG. 1 shows a cross-sectional view of a fan 10 having a multi-stator electric motor 12 that is configured in accordance with preferred embodiments of the invention. To that end, the fan 10 includes an impeller 14 mechanically coupled to the motor 12, and an exterior fan housing 16. The fan housing 16 may be manufactured from metal, plastic, or other suitable material. It should be noted, however, that use of preferred embodiments of the motor 12 within the fan 10 is for exemplary purposes only. Accordingly, preferred embodiments of the motor 12 may be used in both related and unrelated applications.

Figure 2A:
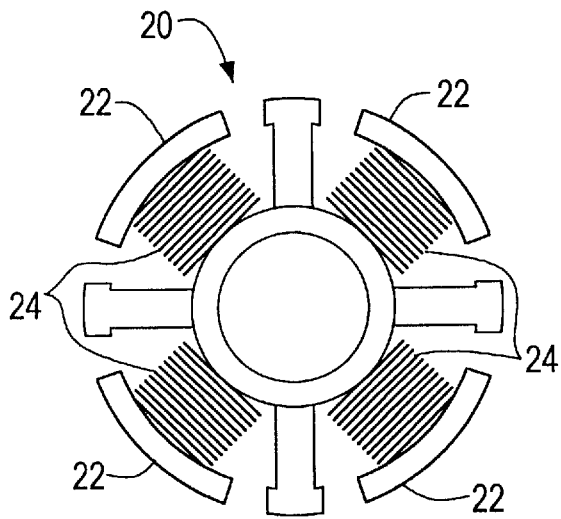
FIGS. 2A and 2B schematically show first and second stators that are angularly offset by about forty-five degrees.
Figure 2B:
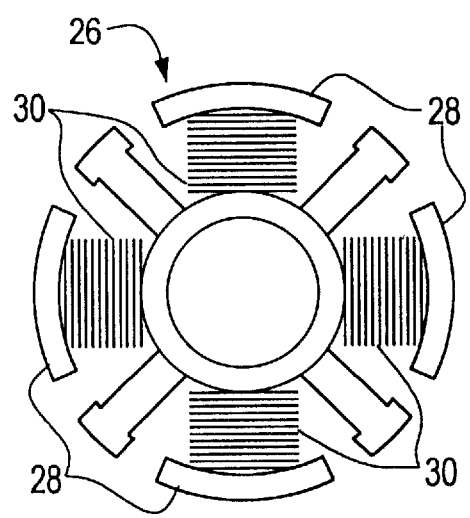
Figure 3:
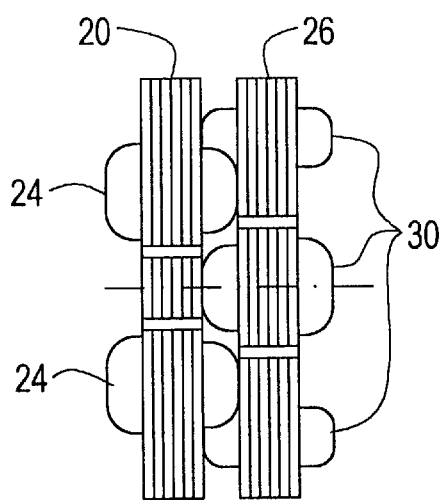
FIG. 3 schematically shows a cross-sectional view of the assembled first and second stators.

The motor 12 includes a rotor 18 for rotating the impeller 14, a first stator 20 having four poles 22 (FIG. 2A) and four windings 24, and a second stator 26 also having four poles 28 (FIG. 2B) and four windings 30. In preferred embodiments, the first stator 20 is substantially concentric with the second stator 26. In other embodiments, the first stator 20 is angularly offset from the second stator 26 by about forty-five degrees, thus improving the output motor torque (see FIGS. 2A and 2B, which show the two stators offset by about forty-five degrees). Output motor torque is improved because each stator provides maximum torque at the null point 32 (FIG. 4) of the other stator. As shown in FIG. 3, the windings 24 of the first stator 20 contact the poles 28 of the second stator 26, while the windings 30 of the second stator 26 contact the poles 22 of the first stator 20. This arrangement reduces the overall profile of the motor 12, consequently reducing the overall profile of the fan 10.

Figure 4:
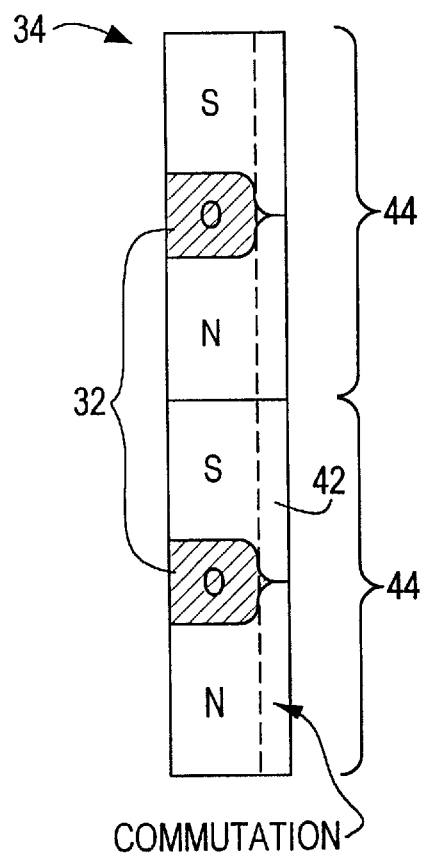
FIG. 4 schematically shows a preferred magnet utilized by the preferred motor shown in FIG. 1.

The rotor 18 preferably includes an annular permanent magnet 34 in a steel cup 36 (FIG. 1). A central shaft 38, which is secured to a top, interior face of the cup 36, preferably is received in a plurality of bearings 40 within the first and second stators 20 and 26. The magnet 34 preferably is a one-piece magnet and has the magnetic pattern shown in FIG. 4. As shown in FIG. 4, the magnet 34 preferably includes a commutation section 42 and two north-south pairs 44 that each have the aforementioned null point 32.

Figure 5:
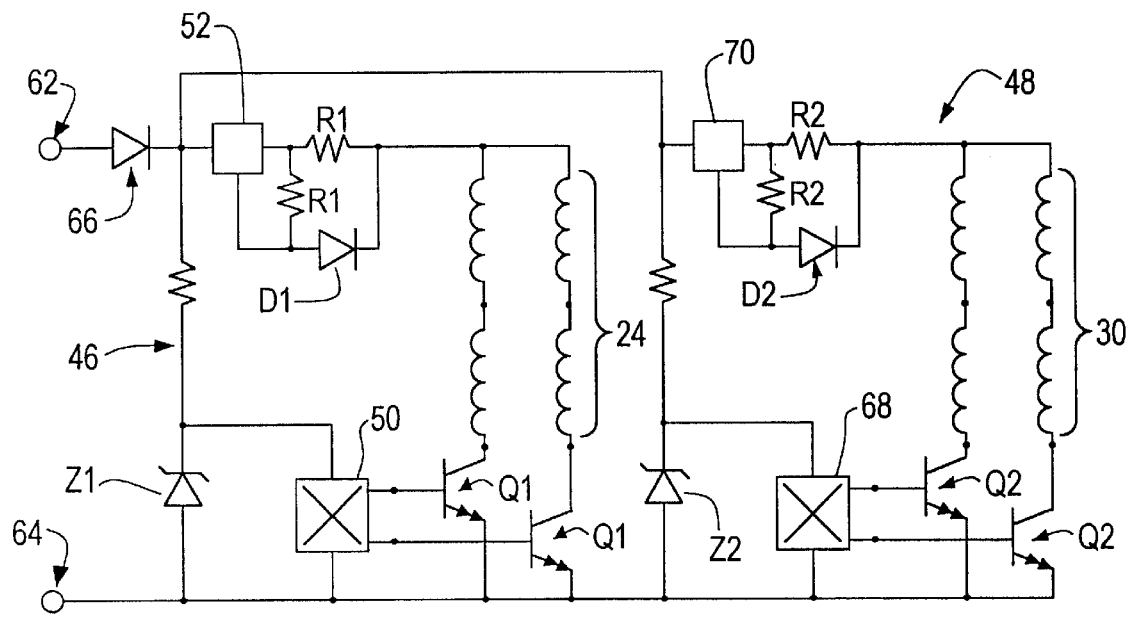
FIG. 5 schematically shows preferred first and second stator circuits for controlling the energization of the first and second stators.

In accordance with preferred embodiments of the invention, the windings 24 and 30 in each of the stators each are energized by independent first and second stator circuits 46 and 48. More particularly, as shown in FIG. 5, the windings 24 of the first stator 20 are energized by the first stator circuit 46, while the windings 30 of the second stator 26 are energized by the second stator circuit 48. The two stator circuits preferably share no common elements and thus, operate independently of each other. In the event that one of the two stator circuits 46 or 48 fails, then the other stator circuit should continue energizing its corresponding windings. Accordingly, although at a reduced capacity, the fan 10 should continue to operate even if one such stator circuit fails.

As noted above, FIG. 5 shows a preferred embodiment of the first and second stator circuits 46 and 48. The first stator circuit 46 includes a first Hall effect sensor 50 for determining the rotational position of the rotor 18, a first current limiting element 52 for significantly limiting current if the temperature of the first stator circuit 46 increases above a predetermined temperature, and a first Zener diode regulator Z1 across the input of the first Hall sensor 50 for limiting the maximum input voltage to the first Hall sensor 50. The first current limiting element 52 preferably includes two accompanying resistors ("first circuit resistors R1") and a diode ("first circuit diode D1") for limiting voltage and current into the first circuit. Additionally, the first Hall sensor 50 preferably has a transistor pair ("first circuit transistor pair Q1") coupled to its two output ports to control switching to the four windings 24 of the first stator 20. A direct current ("DC") input voltage preferably is applied across first and second terminals 62 and 64, which may include a reverse polarity diode 66 to ensure against potential reverse polarity conditions. The reverse polarity diode 66 is optionally included in preferred embodiments and thus, need not be included on the first terminal 62. The DC input voltage (e.g., twelve volts) may be produced from any known source such as, for example, a battery or a conventionally rectified alternating current ("AC") voltage source.

As shown in FIG. 5, the second stator circuit 48 includes elements that are substantially identical to, but operatively independent from, the elements in the first stator circuit 46. More specifically, the second stator circuit 48 includes a second Hall effect sensor 68 for determining the rotational position of the rotor 18, a second current limiting element 70 for significantly limiting current if the temperature of the second stator circuit 48 increases above a predetermined temperature, and a second Zener diode regulator Z2 across the input of the second Hall sensor 68 for limiting the maximum input voltage to the second Hall sensor 68. The second current limiting element 70 preferably includes two accompanying resistors ("second circuit resistors R2") and a diode ("second circuit diode D2") for limiting voltage and current into the second stator circuit 48. Additionally, the second Hall sensor 68 preferably has a transistor pair ("second circuit transistor pair Q2") coupled to its two output ports to control switching to the four windings 30 on the second stator 26. In a manner similar to the first stator circuit 46, power to the second stator circuit 48 is derived from a DC input voltage applied across the first and second terminals 62 and 64. In an alternative embodiment, the current limiting elements 52 and 70 may include other known current limiting devices. Those devices may include, but are not limited to, power MOSFETS or power transistors with appropriate sensing circuitry, or positive temperature coefficient ("PTC") thermistors, which are sensitive to incremental current conditions.

As shown in FIG. 1, the first and second stator circuits 46 and 48 may be formed on a printed circuit board 80 within the housing 16. The first Hall sensor 50 and second Hall sensor 68 preferably extend upwardly from the circuit board 80 and into the rotor 18 for sensing the rotational position of the magnet 34. In preferred embodiments, the first Hall sensor 50 and second Hall sensor 68 are circumferentially positioned on the circuit board 80 in any one of several forty-five degree multiples. For example, the Hall sensors 50 and 68 may be circumferentially positioned apart by either one of about forty-five degrees, ninety degrees, one hundred thirty-five degrees, one hundred eighty degrees, two hundred twenty-five degrees, two hundred-seventy degrees, or three-hundred fifteen degrees. If more than two stators are used, then those skilled in the art should be able to position each Hall effect sensor in the resulting circuits appropriately.

Figure 6:
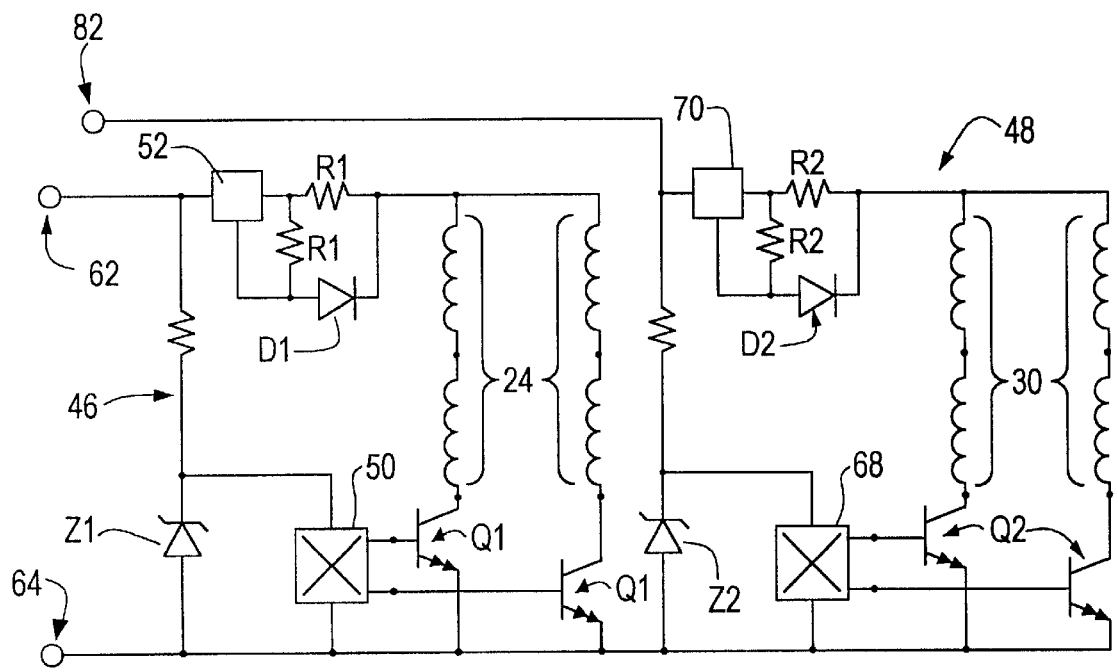
FIG. 6 schematically shows an alternative embodiment of first and second stator circuits for controlling the energization of the first and second stators.

FIG. 6 shows another embodiment of the first and second stator circuits 46 and 48 in which independent power sources are utilized for each of the two stator circuits 46 and 48. More particularly, the first stator circuit 46 receives input voltage across the first and second terminals 62 and 64, while the second stator circuit 48 receives input voltage across the third and second terminals 82 and 64. Accordingly, failure of one of the two power sources does not affect operation of the other stator circuit. For example, if a first voltage source (powering the first stator circuit 46) fails, the second stator circuit 48 will operate in an unimpeded manner since such stator circuit does not rely upon such first power source.

In preferred embodiments, the following elements and/or element values may be used:

first and second Hall sensors 50 and 68: Model Number SS42R Microswitches, available from Honeywell Microswitch Incorporated of Freeport, Ill.;

first and second current limiting elements 52 and 70: Model Number LM317T devices, available from SGS Thompson Microelectronics of Phoenix, Ariz.;

first and second circuit resistors RI and R2: about one Ohm;

first and second circuit diodes D1 and D2: conventionally known model number 1N4003 diodes;

transistors in the first and second transistor pairs Q1 and Q2: conventionally known model number TIP102 transistors;

Zener diodes Z1 and Z2: Conventionally known model number 1N759 Zener diodes;

reverse polarity diode 66: conventionally known model number 1N4003 diode;

As suggested above, alternative embodiments of the invention include three or more stators that each have independent stator circuits. Accordingly, failure of all but one stator circuit should not cause the rotor 18 to stop rotating. In a manner similar to the first and second stator circuits 46 and 48 described above, each additional stator circuit preferably includes independently operating Hall sensors, voltage regulator Zener diodes, and current limiting elements. Of course, additional elements may be added as necessary to further control the windings of each stator. Conversely, certain of the elements of the stator circuits may be omitted such as, for example, the current limiting elements. Omission of such element, however, may reduce circuit reliability and performance.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A DC electric motor comprising:
   a rotor that rotates through a plurality of rotational positions;
   a first stator having first stator circuitry and a first winding, the first stator circuitry energizing the first winding in response to the rotational position of the rotor, the first winding being distributed about the first stator; and
   a second stator having second stator circuitry and a second winding, the second stator circuitry energizing the second winding in response to the rotational position of the rotor, the second winding being distributed about the second stator;
   the operation of the first stator circuitry being configured to energize the first winding when the second stator circuitry fails to energize the second winding,
   the first stator circuitry being self-controlling,
   the first stator and second stator being stacked.

2. The motor as defined by claim 1 wherein the operation of the second stator circuitry is substantially unaffected by a failure of the first stator circuitry to energize the first winding.

3. The motor as defined by claim 1 wherein the first stator circuitry includes means for receiving power from a first power source.

4. The motor as defined by claim 3 wherein the second stator circuitry includes means for receiving power from a second power source.

5. The motor as defined by claim 1 wherein the first stator circuitry includes:
   a first voltage regulator for regulating input voltage into the first stator circuitry; and
   a first current limiter for limiting input current into the first stator circuitry.

6. The motor as defined by claim 5 wherein the second stator circuitry includes:
   a second voltage regulator for regulating input voltage into the second stator circuitry; and
   a second current limiter for limiting input current into the second stator circuitry.

7. The motor as defined by claim 1 wherein the first stator is substantially concentric with the second stator.

8. The motor as defined by claim 1 wherein the first stator is angularly offset from the second stator.

9. The motor as defined by claim 1 wherein the rotor includes an impeller.

10. The motor as defined by claim 1 wherein the first stator includes a first pole, the second winding contacting the first pole.

11. A DC electric motor comprising:
    a rotor that rotates through a plurality of rotational positions;
    a first stator having a first winding distributed about the first stator;
    a second stator having a second winding distributed about the second stator, the first stator and second stator being stacked;
    first stator circuitry for energizing the first winding when the rotor is in a first rotational position;
    second stator circuitry for energizing the second winding when the rotor is in a second rotational position,
    the first stator circuitry being self-controlling,
    the first stator circuitry being substantially independently operable from the second stator circuitry.

12. The motor as defined by claim 11 wherein the first rotational position is different from the second rotational position.

13. The motor as defined by claim 11 wherein the first stator circuitry is subject to failing to energize the first winding when the rotor is in the first rotational position, the second stator circuitry energizing the second winding when the first stator fails to energize the first winding when the rotor is in the first rotational position.

14. The motor as defined by claim 11 wherein the first stator circuitry includes means for receiving power from a first power source.

15. The motor as defined by claim 14 wherein the second stator circuitry includes means for receiving power from a second power source, the second power source being different from the first power source.

16. The motor as defined by claim 11 wherein the first stator circuitry includes:
    a first voltage regulator for regulating input voltage into the first stator circuitry; and
    a first current limiter for limiting input current into the first stator circuitry.

17. The motor as defined by claim 11 wherein the first stator includes a first pole, the second winding physically contacting the first pole.

18. A DC electric motor comprising:
    a rotor that rotates through a plurality of rotational positions;
    a first stator having a first winding distributed about the first stator;
    a second stator having a second winding distributed about the second stator, the first stator and second stator being stacked;
    first stator circuitry for energizing the first winding when the rotor is in a first rotational position;
    second stator circuitry for energizing the second winding when the rotor is in a second rotational position,
    the first stator circuitry being self-controlling,
    the first stator circuitry and second stator circuitry having no common circuit elements.

19. The motor as defined by claim 18 wherein the first rotational position is different from the second rotational position.

20. The motor as defined by claim 18 wherein the first stator circuitry is substantially independently operable from the second stator circuitry.

21. The electric motor as defined by claim 1 wherein the first stator includes a plurality of integral poles, and the second stator includes a plurality of integral poles, the first stator poles being electrically isolated from the second stator poles.

22. The electric motor as defined by claim 1 wherein the rotor includes a shaft having a shaft end, the first stator being spaced a first distance from the shaft end, the second stator being spaced a second distance from the shaft end, the first distance being less than the second distance.

23. The motor as defined by claim 18 wherein the first rotational position is the same as the second rotational position.

24. The motor as defined by claim 11 wherein the first rotational position is the same as the second rotational position.

* * * * *